United States Patent [19]

Tanaka et al.

[11] Patent Number: 4,983,411

[45] Date of Patent: Jan. 8, 1991

[54] STERILIZATION OF VACUUM PACKAGED RAW MEAT

[75] Inventors: Yoshio Tanaka; Katsumi Kawaguchi, both of Tokyo, Japan

[73] Assignee: Kureha Chemical Industry Co., Ltd., Tokyo, Japan

[21] Appl. No.: 397,983

[22] Filed: Aug. 24, 1989

[30] Foreign Application Priority Data

Aug. 29, 1988 [JP] Japan .................... 63-212530

[51] Int. Cl.$^5$ .................... A23B 4/005; A23B 4/015
[52] U.S. Cl. .................... 426/234; 426/129; 426/248; 426/412
[58] Field of Search ................ 426/234, 248, 412, 129

[56] References Cited

U.S. PATENT DOCUMENTS

| | | | |
|---|---|---|---|
| 2,169,081 | 8/1939 | James | 426/248 |
| 2,364,049 | 12/1944 | Bensel | 426/248 |
| 2,384,203 | 9/1945 | Sperti | 426/248 |
| 2,401,131 | 5/1946 | Bensel | 426/234 |
| 2,713,002 | 7/1955 | Williams | 426/248 |
| 4,112,124 | 9/1978 | Jarvis | 426/234 |
| 4,233,323 | 11/1980 | Sway et al. | 426/248 |

FOREIGN PATENT DOCUMENTS

| | | | |
|---|---|---|---|
| 59-31648 | 2/1984 | Japan | 426/248 |
| 60-102157 | 6/1985 | Japan | 426/248 |

OTHER PUBLICATIONS

Food Industries 6/36 p. 295 plus.

Primary Examiner—Steven Weinstein
Attorney, Agent, or Firm—Rosen, Dainow and Jacobs

[57] ABSTRACT

This invention relates to a sterilization process for vacuum-packaged raw meat, comprising vacuum-packaging, ultraviolet sterilization and heat shrinkage in sequence.

The present invention provides an apparatus comprising an ultraviolet sterilization apparatus and an apparatus for shrinking film packaging material as an embodiment; sterilization effect obtained by means of the apparatus is great and bacteria as well as mold are sterilized. The packaged product does not change color or smell so that it does not lose its value as merchandise. No deterioration about the product could be found.

4 Claims, 3 Drawing Sheets

STERILIZATION OF VACUUM PACKAGED RAW MEAT

BACKGROUND OF THE INVENTION

1. Field of Utilization

The present invention relates to a process for sterilization, particularly with ultraviolet ray, which is utilized in the technological field of sterilization for vacuum-packaged fresh food such as raw meat i.e. lump or dressed meat of beef, pork, chicken, lamb and the like.

2. Prior Art

It is known that the irradiation of ultraviolet ray with a wave length of 235-275 nm on surface of food has a sterilizing effect.

Utilizing this effect, the irradiation of ultraviolet ray on food surface and the sterilization of food with ultraviolet ray after its vacuum-packaging have been also introduced in the field of food except raw meat. Nevertheless, no example for application of the technique on raw meat has been found.

Conventionally, raw meat such as chilled beef is used to be preserved in tight conditions caused by heat shrinkage of film after the meat is vacuum-packaged with heat shrinking multi-layer film having a barrier function. Certain bacteria in no small quantities are likely to adhere to the surface of packaged raw meat in a period preceding packaging process and owing to their growth, the number of bacteria increases as a preservation period after packaging extends. The extension of the preservation period is desirable while keeping the number of bacteria within the permissible range. It depends on the initial number of bacteria in a fixed condition for preservation.

The combination effect of ultraviolet ray and heat has been described also in the sterilizing method by direct irradiation of ultraviolet ray on food after heating process [Japan Food Industry Society, The 29th Assembly (1982)].

The synergistic effect between heat and ultraviolet ray has been known as described previously. Hence the inventors have found that the ultraviolet sterilization incorporated into the conventional packaging process for chilled beef i.e. the process comprising packing, vacuum-packaging, heat shrinkage and water cooling, is capable of doing the following;

1. to decrease the number of bacteria adhered on the surface,
2. to inhibit the increase of bacterial growth in number during the preservation period, and
3. to depress the discharge of acidification smell and gas. As a result, the inventors have achieved the present invention.

It has been also found that the ultraviolet sterilization process may be significantly carried out when it is incorporated after vacuum-packaging and before heat shrinkage and in that case, the effects achieved by the process may be remarkable.

In relation to the combination effect of ultraviolet ray and heat, the process comprising vacuum-packaging, ultraviolet sterilization and heat shrinkage in sequence according to the invention may have much greater effects than that comprising vacuum-packaging, heat shrinkage and ultraviolet sterilization in sequence because in the latter process the following is considered to occur.

1. Heat melts fat on surface of raw meat more or less, so that the bacteria present on the surface of fatty portions and meat portions adjacent to the fatty portions are covered with the melted fat. As a result, the irradiation of ultraviolet ray thereafter can not sufficiently reach the bacteria.
2. Heating causes the tissue on raw meat surface to get loose so that meat juice extrudes into the surface thereof to inhibit the transmission of ultraviolet ray.
3. Raw meat is not of regular shape and thus, hot water is likely to remain in sunken portions on the surface of film packaging in the case of hot water heating, so that the transmissivity of ultraviolet ray reduces. Moreover, the hot water remaining acts as lenses so that ultraviolet ray does not reach the surface of raw meat and the like uniformly.
4. Ultraviolet irradiation after heating lengthens the period from heating to cooling because the process of ultraviolet irradiation requires some time, whereas some change of products such as in color is liable to occur to make their values as merchandise lower.
5. In the case of heating by hot water and steam, packaging material changes its color into white because of absorption of water so that the transmissivity of ultraviolet ray reduces.
6. In the case of heating by hot water and steam, water drop is likely to adhere to the surface of the packaging material and the drop falls down, causing contamination of ultraviolet lamps underneath; evaporation of water drop also causes contamination of ultraviolet lamps in surrounding environment, resulting in gradual reduction of irradiation dose of ultraviolet ray. For its prevention, frequent cleaning is required and it takes a lot of time and labor.

SUMMARY OF THE INVENTION

The present invention solved the above problems, and an object of the invention is to provide a sterilization process for vacuum-packaged raw meat wherein sterilization effects by heating and ultraviolet ray are able to be expressed independently of one another.

In accordance with the invention, the above purpose is accomplished by the sterilization process for raw meat vacuum-packaged with film packaging material possessing transmissivity of ultraviolet ray and heat shrinkage comprising irradiating with ultraviolet rays a packaged product of raw meat vacuum-packaged with film packaging material and putting the above packaged material into high-temperature atmosphere suitable for heat shrinkage of film packaging material.

The irradiation dose of ultraviolet ray reaching the packaged product per unit area may preferably be in the range of 100–2000 mW·sec/cm$^2$.

The high-temperature atmosphere for heat shrinkage of film packaging material is preferably in the range of 70–92° C., considering the conditions for both the heat shrinkage and the sterilization.

As for high-temperature atmosphere, at least any one of hot water bath, hot water shower and injection steam may be used.

According to the invention, bacteria such as *Escherichia coli* and heat resisting bacteria, which are sensitive to ultraviolet ray are sterilized in the first instance by irradiation of ultraviolet ray. The film packaging material closely adhering to raw meat by means of vacuum packaging enables uniform irradiation of ultraviolet ray. Furthermore, problems such as reduction of transmissivity of ultraviolet ray and the like, following heating before ultraviolet irradiation, should not occur as they have occurred previously.

Then, bacteria such as *E. coli* and mold, which are sensitive to heating, are sterilized in high-temperature atmosphere. That is, *E. coli* is remarkably sterilized by the heating process following the ultraviolet sterilization; mold which is not able to be sterilized by ultraviolet ray is sufficiently sterilized in this step.

This two-step sterilization comprising the irradiation of ultraviolet ray and heating greatly improves sterilization efficiency. Then, rapid cooling of a packaged product after the above process may maintain the quality thereof.

DETAILED DESCRIPTION OF THE PREFERRED EMBODIMENT

Examples of the invention will be explained with reference to brief illustration of attached drawings.

Figure 1:
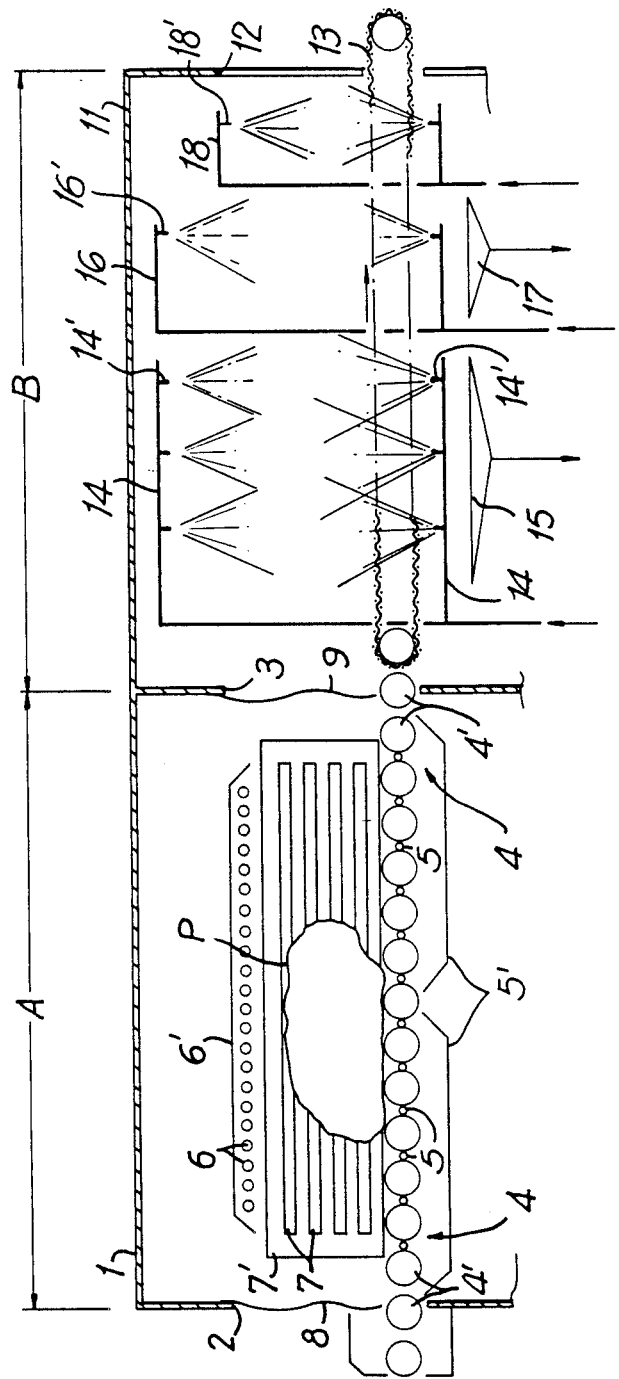
FIG. 1 is a longitudinal sectional view of the outline of the apparatus used in an embodiment of the present invention.

FIG. 1 shows a longitudinal sectional view of the primary portions of the apparatus of the present embodiment comprising an ultraviolet radiation apparatus A and an apparatus B for shrinking package material.

The ultraviolet radiation apparatus A has a roller conveyor 4 extending from the lower portions of an entrance opening 2 and to the lower portions of an opening 3 inside of a box-shaped chamber 1 the side of which is formed to have the entrance opening 2 and the opening 3 for the above apparatus B for shrinking package material. Ultraviolet lamps 5 are disposed between mutually adjacent ones of those rollers 4' at the position slightly below the conveyance plane of the roller conveyor 4. The ultraviolet lamps 6, 7 are arranged at the positions above and side of the roller conveyor 4 so as to surround a packaged product P to be conveyed by the above roller conveyor. Reflector plates 5', 6', 7' are disposed outside of the above ultraviolet lamps 5, 6, 7, respectively, so as to inwardly reflect the ultraviolet ray emitted outward toward the packaged product P.

Curtains 8, 9 each of which comprises a plurality of vertical strips are suspended at the entrance opening 2 and the opening 3 and those curtains are capable of passing the packaged product P on the conveyor 4 and to prevent the leakage of ultraviolet ray outward.

The apparatus B for shrinking packaging material has an exit opening 12 and comprises various equipments in the box-shaped chamber 11 formed adjacent to the box-shaped chamber 1 of the ultraviolet radiation apparatus A described above.

A conveyor 13 is disposed extending between the lower portions of the opening 3 and those of exit opening 12 in the way similar to the ultraviolet radiation apparatus A. The conveyor 13 is made of metallic net so that it has heat resisting property and in addition it is able to transmit water and air naturally without resistance.

A piping 14 having nozzles 14' is arranged in a position suitable to receive hot water supply from the outward and sprinkle it above and under the packaged product on the conveyor 13 in the region of approximately half of the left inside of the box-shaped chamber 11. Moreover, a saucer 15 to receive hot water after its use and drain it, is arranged underneath the lower nozzle 14'.

On the right side of the piping 14 having the nozzles 14' to sprinkle hot water, a piping 16 having nozzles 16' to sprinkle cold water is disposed. This is also arranged above and under the position of the conveyor 13. A saucer 17 to receive cold water after its use and to drain it, is disposed in the lower position of the conveyor 13.

Furthermore, on the right side of the piping 16 having the nozzle for sprinkling cold water, a piping 18 having nozzles 18' to inject air above or under the position of the conveyor is disposed.

The sterilization process for vacuum-packaged raw meat by the apparatus of the present embodiment will now be described.

1. The raw meat P vacuum-packaged with packaging film (packaged product) is carried in on the roller conveyor 4 from the entrance opening 2 of the ultraviolet sterilization apparatus A.

2. The packaged product P is conveyed through the ultraviolet sterilization apparatus A to the opening 3 by the roller conveyor 4 and meanwhile, the product is irradiated with ultraviolet ray from surrounding ultraviolet lamps 5, 6, 7. The ultraviolet ray transmits film packaging material to uniformly reach the surface of raw meat as a packaged product, resulting in the sterilization of bacteria on the surface.

3. The packaged product P is fed from the ultraviolet sterilization apparatus A through the opening 3 into the apparatus B for shrinking packaging material. In the apparatus B for shrinking packaging material, the packaged product P is conveyed on the conveyor 13 and hot water is sprinkled from the nozzles 14' above and under the conveyor 13 of metallic net. The fin-like portion of the film packaging material bulged out in vacuum-packaging process from the packaged product shrinks, and the film adheres to the raw meat more closely. At the same moment, heat from hot water is conducted to raw meat through the film to sterilize the bacteria on the surface. That is, the bacteria which is not sterilized by ultraviolet ray may be sterilized by heat. A synergistic effect on the sterilization ratio will be produced, because in this process bacteria are damaged by ultraviolet ray while they are sterilized by heating.

4. The packaged product sterilized by heat is not left to stand as it is hot after heating and immediately after the heating it is quickly chilled by cold water from the 16'. Thus the raw meat and the like do not change their color.

5. The water remaining on the surface of the above packaged product is removed by air injected from nozzles 18'. Generally, raw meat and the like are of irregular shape with rough surface having hollows and protrusions so that hot water in the process 2 tends to remain in the surface hollows. That is the reason why air is injected in order to remove water.

6. The packaged raw meat product the surface of which is sufficiently sterilized, is carried out on the conveyor 13 and is taken out as merchandise.

The invention is now shown in definite figures.

The wave length of ultraviolet ray in the range of 235-275 nm (nanometer) is effective; more particularly about 253.7 nm is effective.

The film packaging materials of the invention include those having heat shrinking property; by the heat shrinking property herein is meant a percentage of area shrinking about 20% or more at the condition of 3-second heating at 90° C. For example, a simple substance drawn uniaxially or biaxially such as polyvinyl chloride (PVC), vinylidene chloride (PVDC), copolymer of ethylene-vinylalcohol (EVOH), nylon (PA), polyethylene (PE) and the like or a complex film comprising at least one of those described above.

The irradiation dose of ultraviolet ray of the wave length described above depends on the transmission rate of ultraviolet ray through the film packaging material. The transmission rate is commonly in the range of 60-90% and the ultraviolet dose reaching the surface of packaged product may preferably be adjusted at 100-2000 mW·sec/cm$^2$. The lowest limit value is selected because below the lowest limit value, the sterilization effect gets low. The upper limit value is selected because the sterilization effect already reaches the saturation state at the value and in addition certain problems such as unusual smell occurs when exceeding the upper limit value.

As for heating temperature for shrinking film packaging materials, the packaging film of the film packaged product may preferably be at 70°-92° C. Below 70° C. as the lowest limit value, sufficient heat shrinkage can not be attained and therefore, the sterilization effect is low. The upper limit value is selected because at the temperature exceeding the upper limit value, raw meat and the like change their color and taste and are deteriorated of appearance because of the increase in melted fat. The period for heating may preferably be 1-10 seconds. The lowest limit value and the upper limit value are selected, based on the same reason in the selection of the temperature range.

Figure 2:
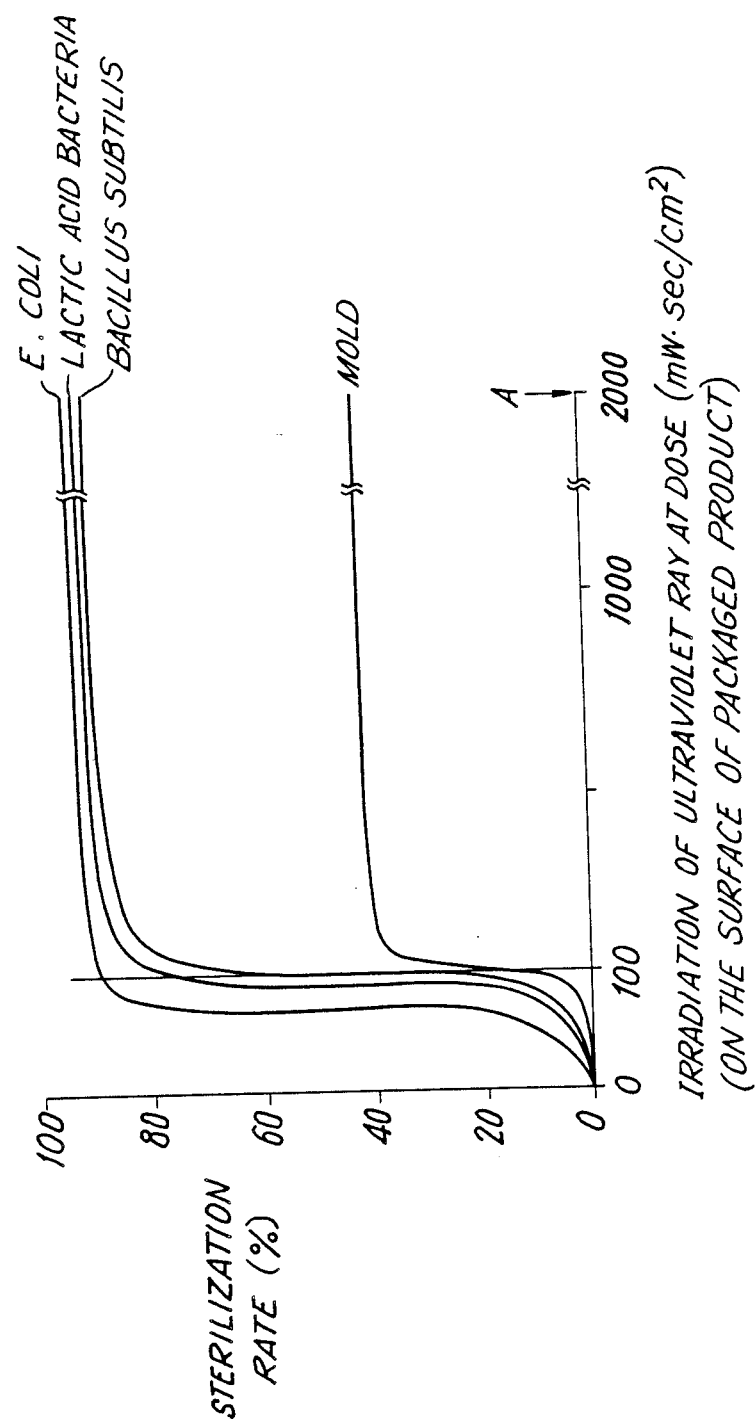
FIG. 2 is a graph which shows an example of sterilization rates by the irradiation of ultraviolet ray.

Sirloin beef each of which is compulsively contaminated with $E.\ coli$ of about $1.2 \times 10^5$, lactic acid bacteria of about $3.8 \times 10^5$, $Bacillus\ subtilis$ of about $6.3 \times 10^5$ cells/cm$^2$ and the spore of $Aspergillus\ niger$ of about $1.2 \times 10^3$ cells/cm$^2$, respectively, is vacuum-packaged with the multi-layer film packaging material (ultraviolet transmission rate: about 80%) comprising PVDC (wherein EVA is used as the outer layer, while ionomer is used as the inner layer; whole thickness of 60 μm). The above beef was irradiated with ultraviolet ray of 253.7 nm while changing its dose and as a result, sterilization rates for each spieces of the bacteria are obtained as shown in FIG. 2. Smell of oxidized oil is felt at point A of the figure and it is found that the irradiation dose exceeding the dose at A damages the values as merchandise. From this fact, it is confirmed that the ultraviolet dose to reach the surface of a packaged product in the range of 100-2000 mW·sec/cm$^2$ is effective.

In measuring the ultraviolet transmission rate, the intensity of direct ultraviolet ray from the ultraviolet lamp is preliminary determined by UV RADIOMETER 254 (manufactured by Sankyo Electric Company) and the obtained value is defined as 100%. Then, the intensity is remeasured after the sensor of UV RADIOMETER 254 is covered with a film sample to calculate the transmission rate based on the obtained value. The rate is expressed in %.

As for sterilization rates, sterilized gauze is prepared by infiltrating 1 ml of sterilized physiological saline (0.85% NaCl) containing 0.2% Tween 80 into gauze to wipe the surface of a sample (10×10 cm) to be irradiated prior to the irradiation of ultraviolet ray. Then the gauze is immersed in 9 ml of sterilized physiological saline to wash out the bacteria adhering to the gauze. The resulting solution is used as an experimental sample and the number of bacteria therein is measured according to the routine method. The measured value is defined as 100%. After the irradiation of ultraviolet ray, the area adjacent to the irradiated area is similarly wiped off to measure the number of bacteria for calculating the sterilization rate to be expressed in %.

Figure 3:
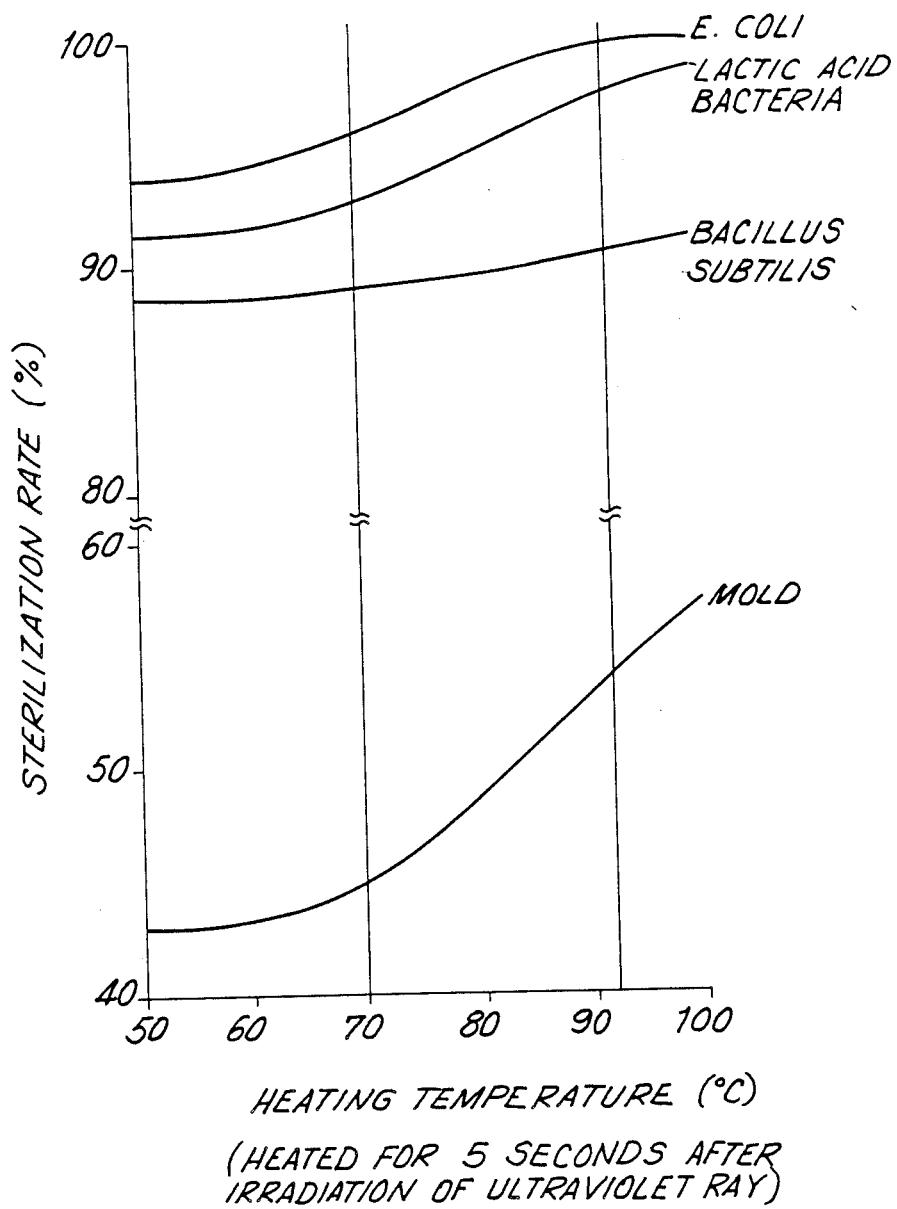
FIG. 3 is a graph which shows an example of the sterilization rates when heating was conducted after the irradiation of ultraviolet ray.

As for heating, a sterilization test by hot-water heating (heating period is 5 seconds) has been done on the same sample as those used in the ultraviolet irradiation test and the results are shown in FIG. 3. These results validate the sterilization effect in the temperature range between the lowest limit value of 70° C. and the upper limit value of 92° C.

Thus, the experimental results about beef sirloin in the same condition to those described above are shown in the following cases and they are compared in Table 1.

1. As an experimental example according to the invention, the sample was heated for 5 seconds by hot water at 90° C. following the irradiation of ultraviolet ray at the dose (as the dose on the surface of a packaged product) of 350-600 mW·sec/cm$^2$ in accordance with the invention.
2. As a comparative example (I), the ultraviolet irradiation was performed after heating (each condition for heating and ultraviolet irradiation is the same as in the above 1).
3. As a comparative example (II), only the ultraviolet irradiation was performed (the irradiating condition therefor is the same as in the above 1).
4. As a comparative example (III), only the heating process was performed (the heating condition is the same as in the above 1).

These results show that those which received the heating process after the irradiation of ultraviolet ray have much greater sterilization effects than other comparative examples.

According to the invention, the heating process is done on vacuum-packaged raw meat after the irradiation of ultraviolet ray. Thus, those problems such as the reduction in the ultraviolet transmission rate caused by the melted fat of raw meat, the reduction in the ultraviolet transmission rate and irregular ultraviolet irradiation caused by heating packaging film, will be solved. Additionally, there may be produced effects such that sanitation and apparent appearance of merchandise may greatly be improved because of the remarkably increased sterilization rate and the uniform irradiation on food surface.

TABLE 1

| Kind of Bacteria | Sterilization Rate (%) | | | |
| --- | --- | --- | --- | --- |
| | Experimental Example | Comparative Example (I) | Comparative Example (II) | Comparative Example (III) |
| E. coli | 99.9 | 91.2 | 94.0 | 3.5 |
| Lactic acid bacteria | 97.2 | 88.4 | 91.5 | 1.3 |
| Bacillus subtilis | 90.3 | 83.9 | 88.4 | 0.5 |
| Mold | 52.7 | 42.6 | 43.1 | 10.6 |

What is claimed is:

1. A process for sterilizing and vacuum packaging raw meat comprising: vacuum packaging raw meat in a heat shrinkable, ultraviolet transmissive packaging film; exposing said vacuum package to ultraviolet radiation to irradiate said vacuum packaged raw meat sufficient to result in the sterilization of bacteria on the surface of said raw meat; and then exposing said vacuum package to a high-temperature atmosphere sufficient to heat shrink said packaging film around said raw meat and to further sterilize any remaining bacteria on the surface of said raw meat.

2. The process defined in claim 1, wherein the high-temperature atmosphere is produced by using one or more of a hot water bath, a hot water shower or injection steam.

3. The process defined in claim 2, wherein the dose of ultraviolet ray reaching a surface of the packaged product per unit area is in the range of 100–2000 mW·sec/cm$^2$.

4. The process defined in 3, wherein the high-temperature atmosphere is in the range of 70–92° C.

* * * * *